(12) United States Patent
Smith et al.

(10) Patent No.: US 7,495,794 B1
(45) Date of Patent: Feb. 24, 2009

(54) SYSTEM FOR PRINTING A DOCUMENT WITH RECURRING IMAGES

(75) Inventors: Terry A. Smith, Boise, ID (US); John F. Mauzey, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2003 days.

(21) Appl. No.: 09/620,617

(22) Filed: Jul. 21, 2000

(51) Int. Cl.
*G06F 15/00* (2006.01)

(52) U.S. Cl. .............. 358/1.18; 358/1.16; 358/3.24

(58) Field of Classification Search ............ 358/1.18, 358/1.8, 1.9, 501, 3.24, 3.26, 3.27, 1.15, 358/1.16
See application file for complete search history.

(56) References Cited

U.S. PATENT DOCUMENTS

| | | | |
|---|---|---|---|
| 5,274,761 A | 12/1993 | Davidson et al. | 395/164 |
| 5,542,031 A | 7/1996 | Douglass et al. | 395/114 |
| 5,923,013 A * | 7/1999 | Suzuki et al. | 235/375 |
| 6,014,629 A * | 1/2000 | DeBruin-Ashton | 705/2 |
| 6,052,202 A * | 4/2000 | Shimizu | 358/1.16 |
| 6,243,172 B1 * | 6/2001 | Gauthier et al. | 358/1.18 |
| 6,330,071 B1 * | 12/2001 | Vidyanand | 358/1.15 |
| 6,501,558 B2 * | 12/2002 | Ebina et al. | 358/1.15 |
| 6,624,908 B1 * | 9/2003 | Petchenkine et al. | 358/1.15 |
| 6,819,445 B1 * | 11/2004 | Stevenson et al. | 358/1.15 |

FOREIGN PATENT DOCUMENTS

| | | |
|---|---|---|
| EP | 0093244 | 2/1983 |
| EP | 0658042 A1 | 11/1994 |
| EP | 0689342 A2 | 6/1995 |
| GB | 2263603 A | 11/1993 |

OTHER PUBLICATIONS

Pending U.S. Appl. No. 08/936,568, filed Sep. 24, 1997; Marcus A. Smith et al; "Method and Apparatus For Reducing Printer Memory".
"PCL Implementor's Guide (v6.0)", Hewlett-Packard Company, 1995, pp. 18-8-18-10.

* cited by examiner

*Primary Examiner*—Edward L Coles
*Assistant Examiner*—Chan S Park

(57) ABSTRACT

A printing system for printing documents that includes a recurring image. The printing system includes a computer connected to a printer over a communication link. The computer generates a named sequence to represent the recurring image and a parameter. The parameter value provides the printer with information that can be used to optimize the processing and printing of the named sequence.

4 Claims, 10 Drawing Sheets

SYSTEM FOR PRINTING A DOCUMENT WITH RECURRING IMAGES

CROSS REFERENCE TO RELATED APPLICATIONS

This application includes subject matter related to the co-pending application entitled "SYSTEM FOR PRINTING A DOCUMENT INCLUDING A FIXED FORM" having Ser. No. 09/620,957. That application is incorporated herein by reference, assigned to the same assignee as this application, and filed on even data herewith.

BACKGROUND OF THE INVENTION

A typical printing system includes a personal computer and a printer. The computer is connected to the printer by a communication link, such as a network. The computer is used to generate a document and to then send the document to the printer for printing. The document is sent in the form of page description language (PDL) commands. These commands describe the document. The printer receives these commands and responds by printing the document. "PCL" and "POSTSCRIPT" are each examples of a PDL. PCL is a trademark of the Hewlett-Packard Corporation. POSTSCRIPT is a trademark of Adobe systems incorporated.

Documents often include an image that occurs more than once in a document. For ease of discussion, such an image is referred to herein as a "form". An example of a form may be a company letterhead or a company logo that occurs on each page in a document. An "instance" of the form refers to a particular one of the recurring images.

Current versions of POSTSCRIPT and PCL provide language specific constructs that allow a named sequence of PDL commands to represent a form. For ease of discussion, it will be understood that the phrase "named sequence" as used herein refers to a set of PDL commands that describe a form.

In general, the use of a named sequence can eliminate the need for a computer to repeatedly send the same set of commands to print each instance of a form in a document. As a result, the use of a named sequence can reduce the amount of data that need be transmitted to a printer in order to print a document.

PCL version 6.0, for example, allows for a named sequence to be defined using the "Macro" commands. A Macro is a group of PCL commands that is given a name in the form of an identification number. Once stored in the printer memory, a macro can be executed repeatedly by additional command that calls the identification number of the macro. Versions of the POSTSCRIPT language include similar capability.

The amount of time it takes to print a document is a significant factor in that printer's success in the marketplace. Thus, there is a strong interest in developing techniques to improve the printing speed of a printer. For purposes of this document, the phrase "printing speed" refers to the amount of time it takes for a printer to print a particular document. This time is measured from when the print job is first received by the printer until when the document is completely printed.

Accordingly, techniques that can improve the storage efficiency and speed at which a printer can process and print a named sequence are needed as this can increase the overall printing speed of a document.

SUMMARY OF THE INVENTION

Briefly and in general terms, a printer according to an embodiment of the invention includes an input/output (I/O) port, a control unit and a print engine. The I/O port is capable of receiving PDL commands describing a document. These commands may include a named sequence describing a form and an indicator. The indicator may indicate that permission is granted to print each instance of the form from the same video data. Alternatively, the indicator may indicate that each instance of the form is to be printed from new video data or that the form is a fixed form or that the form represents a background image. The control unit operates to process the named sequence based upon the information provided by the indicator.

The present invention may also be implemented as a method of processing and printing a named sequence of PDL commands that describe a form. The method preferably includes receiving the named sequence and an associated parameter and responding to the parameter being set to a first value by converting the named sequence into video data and then using the video data to print each instance of the form. The method may also include the step of responding to the parameter being set to a second value by generating new video data to print each instance of the form. The named sequence and the parameter can be received from a source externally connected to the printer, such as a personal computer.

The present invention may also be implemented as a computer. A computer according to an embodiment of the invention includes a processor, a memory and an I/O port. The memory includes an application and a print driver. The application and the print driver are executed by the processor and enable the computer to generate a plurality of PDL commands that describe a document. The commands can include both a named sequence describing a form and at least one command indicating permission is granted to convert the named sequence once into video data and to then print each instance of the form from the video data. These PDL commands are transmitted over the I/O port to a printer for printing.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
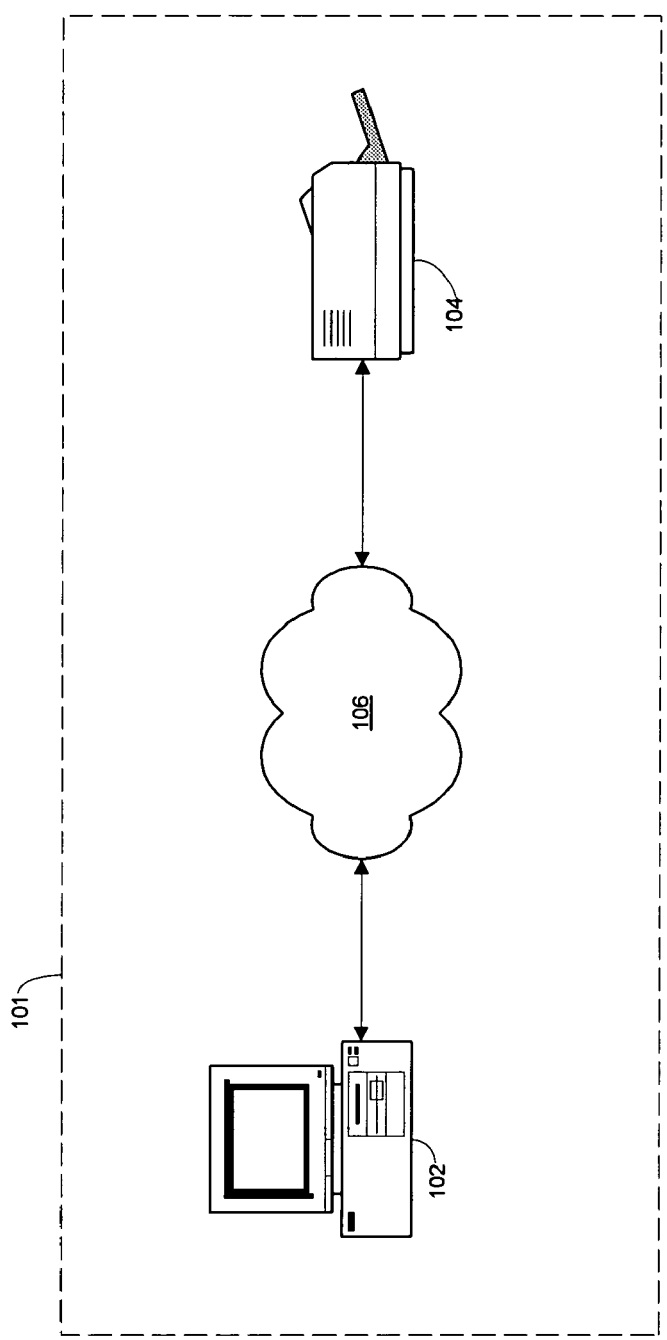
FIG. 1 is a block diagram of a printing system incorporating an embodiment of the invention.

As shown in the drawings for purposes of illustration, the invention is embodied in a novel printing system that includes a computer and a printer. The computer is used to generate documents and to send the documents, in the form of PDL commands, to the printer for printing. Importantly, the computer is able to direct the printer to optimize the processing of a named sequence.

To introduce a first illustrative embodiment of the invention, FIG. 1 is a block diagram of a printing system 101. As shown, the printing system 101 includes a computer 102 and a printer 104 connected via a communication link 106. The communication link 106 may represent any suitable means that allows the computer 102 to transmit PDL commands to the printer 104. Thus, the communication link 106 may represent a network (e.g., an intranet or the INTERNET) or a local port (e.g., a serial port or a parallel port).

It is important to note that the printing system 101 utilizes a page description language that, for ease of discussion, is referred to herein as the "system PDL". The system PDL may, for example, be an extended version of PCL or POSTSCRIPT. Importantly, the system PDL provides the utilities to:

(a) represent a form by a named sequence of PDL commands; and (b) define an "optimization parameter" to indicate certain information regarding the named sequence.

In the present embodiment, the optimization parameter has four predefined values. Table I lists the meaning of each of these four values for an associated named sequence.

TABLE 1

| Optimization Parameter value | Meaning for associated named sequence describing a form |
| --- | --- |
| Value #1 | Each instance of the form is to be printed from new video data. |
| Value #2 | Permission is granted to print each instance of the form from the same video data. |
| Value #3 | If new video data is generated to print each instance of the form, the new video data will, in each case, be identical (i.e., the form is a "fixed form"). |
| Value #4 | The named sequence represents a "background image". |

Figure 2:
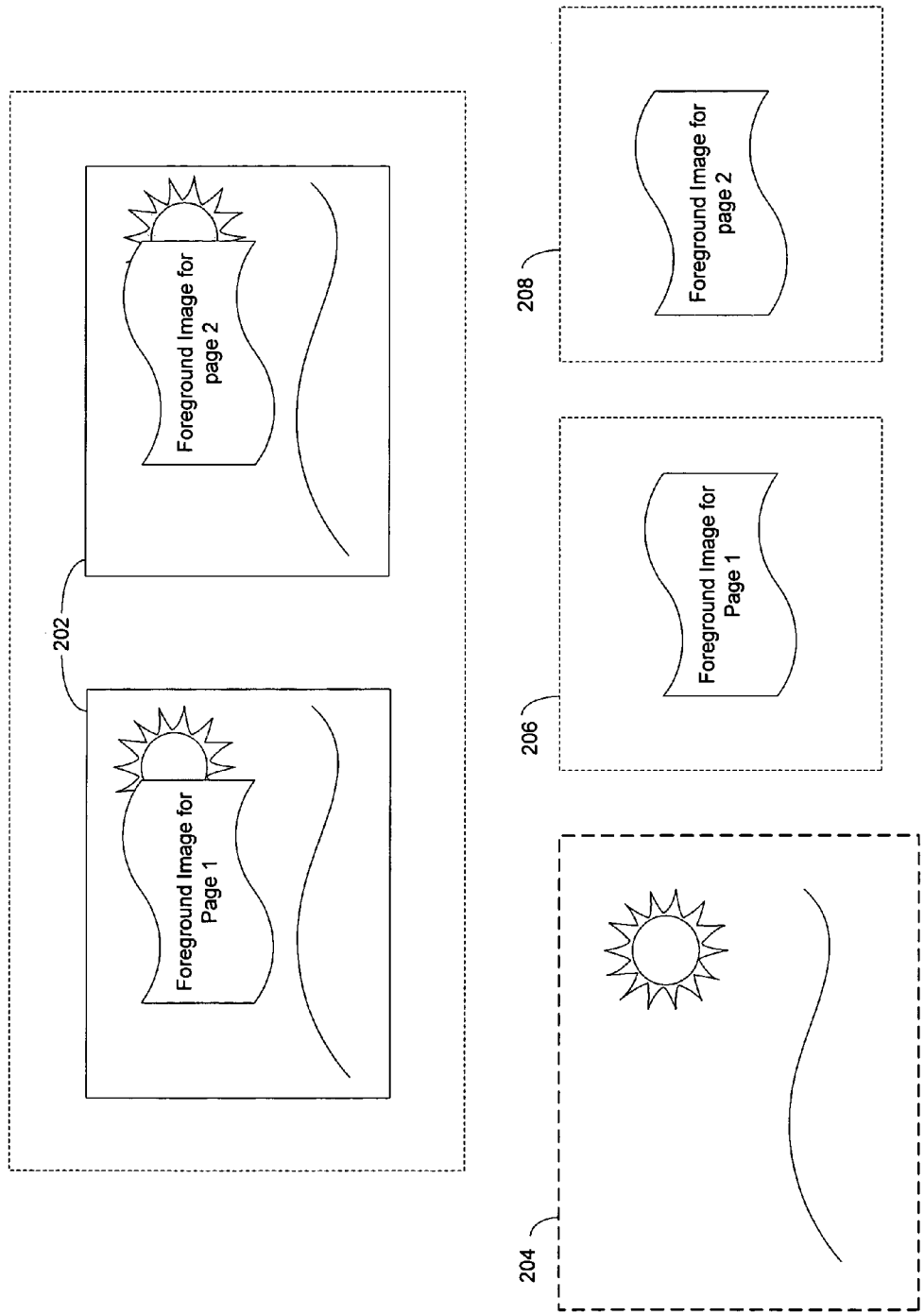
FIG. 2 illustrates a document that includes a background image and a foreground image.

To illustrate the meaning of the phrase "background image", reference is briefly made to FIG. 2. FIG. 2 shows a two page document 202 that includes a background image. The background image is shown within box 204. The respective image on each page that overlaps the background image is referred to as herein as a "foreground image". The foreground image in page 1 of the document 202 is shown in box 206. The foreground image in page 2 is shown within box 208.

For purposes of the later discussion, video data that represents a background image is referred to herein as "background video data". Video data that represents a foreground image is referred to herein as "foreground video data".

Figure 3:
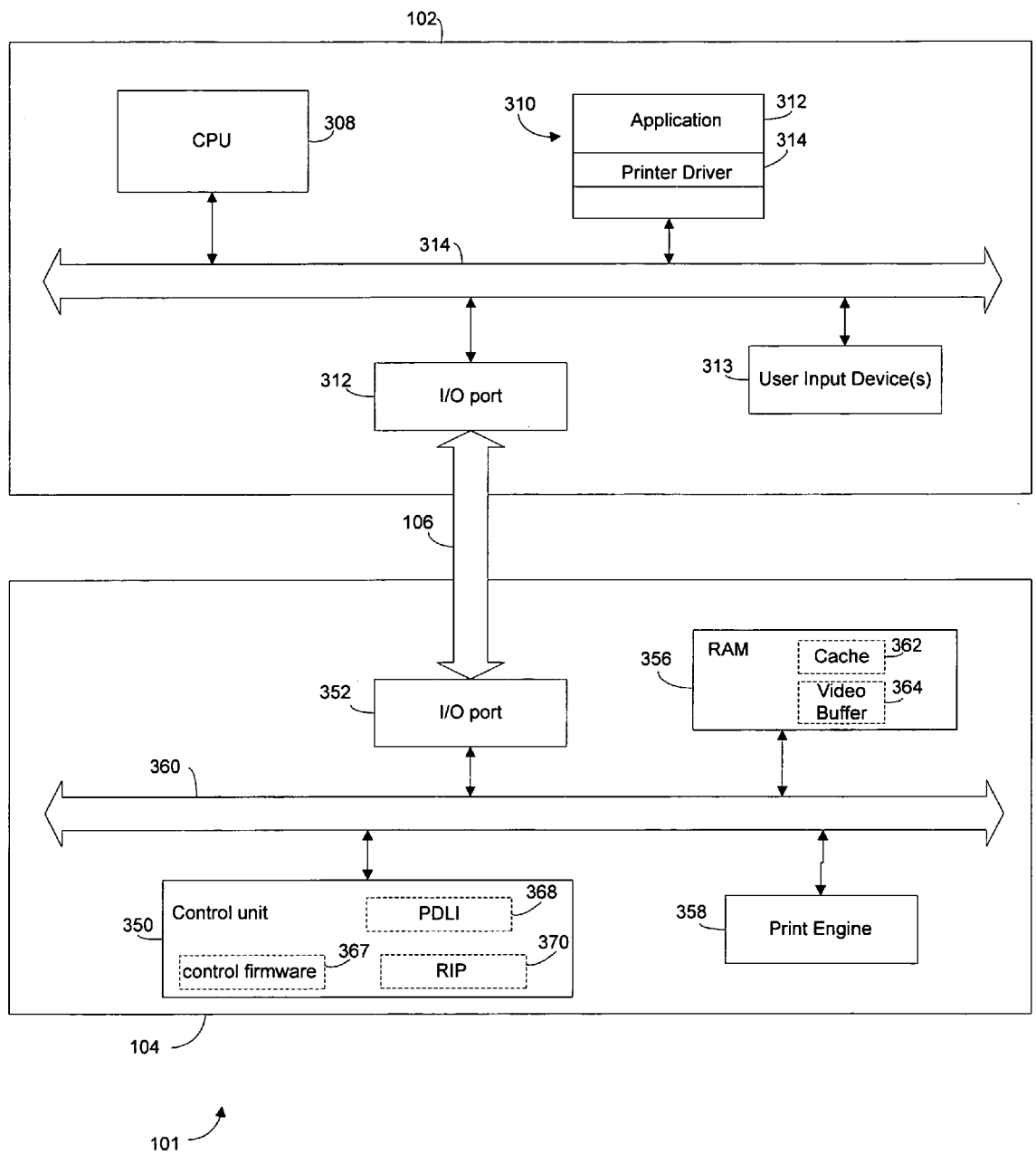
FIG. 3 is a high level schematic of the computer and the printer shown in FIG. 1.

FIG. 3 shows a high level schematic of the computer 102 and the printer 104. As shown in FIG. 3, the computer 102 includes a processor 308, a memory 310, an Input/output (I/O) port 312, and one or more user input devices 313. All these components are connected via a local bus 314. The I/O port 312 is used to couple the computer 102 to the communication link 106. The user input device(s) 313 may include a standard keyboard and a pointer device. The processor 308 is used to execute programs stored in the memory 310. These programs include an application program (application) 312 and a print driver 314.

The printer 104 includes a control unit 350, a Random access memory (RAM) 356, an I/O port 352 and a laser print engine 358. All these components are connected via a local bus 360. As indicated, the RAM 356 includes a cache storage area 362 and a video buffer 364. Alternatively, or in addition, the printer 104 may include a local disk for use as a cache storage area.

The control unit 350 operates under the direction of the firmware program 367 and provides both control and imaging facilities for the printer 104. As indicated, the control unit 350 includes a page description language interpreter module (PDLI) 368 and a raster image processor module (RIP) 370. Both of these modules may be implemented by firmware programs or hardware devices or by a combination of firmware and hardware devices.

In general, a user of the computer 102 can provide input to the application 312 (via the user input devices 313) to generate a document. In response to further input from the user, the application 312 interacts with the print driver 314 to cause the print driver 314 to transmit the document, in the form of PDL commands, to the printer 104 for printing.

Upon receiving the PDL commands over the I/O port 352, the control unit 350 responds by processing the commands to generate video data and to transmit the video data to the print engine 358. The print engine 358 responds to the video data received from the video buffer 364 in a standard manner by generating printed output.

As part of the processing operation performed by the control unit 350, the PDLI 368 is used to convert the PDL commands into display list data; the RIP 370 is used to convert the display list data into video data; the video buffer 364 is used to buffer the video data before being transmitted to the print engine 358. In addition, the control unit 350 manages the storage of the display list data and the video data in the RAM 356.

Figure 4:
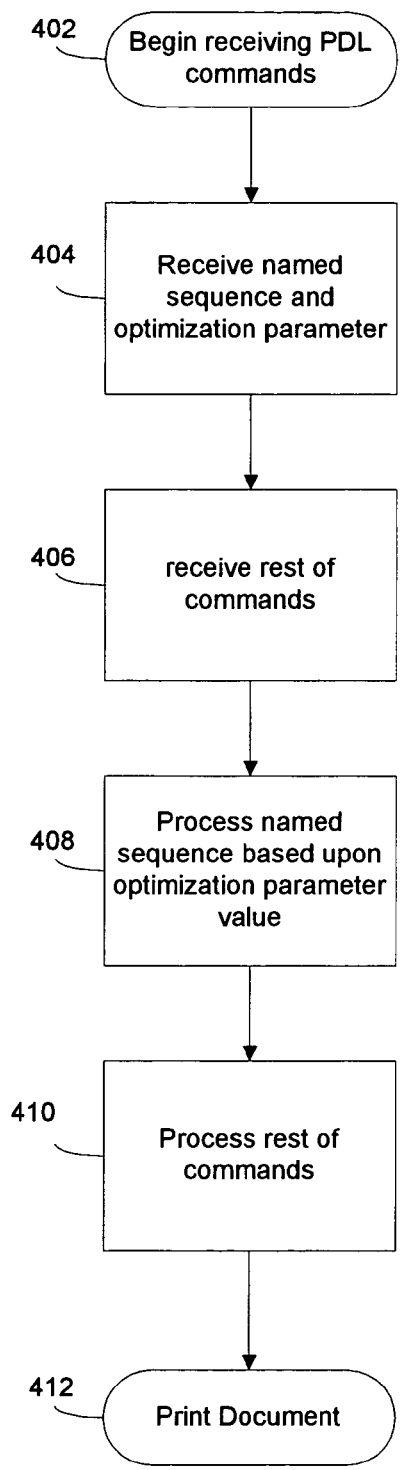
FIG. 4 is a flow chart illustrating the operation of the printer control unit upon receiving a set of PDL commands.

FIG. 4 illustrates the operation of the control unit 350 upon receiving a set of system PDL commands, from the computer 102, describing a document. The steps depicted in FIG. 4 are performed by the control unit 350 while operating under the direction of the firmware program 367. It is assumed that the set of commands include both a named sequence of commands describing a form. In addition, it is assumed that the set of commands further define an optimization parameter value for the named sequence.

Referring now to FIG. 4, the printer 104 begins receiving the PDL commands from the computer 102 over the I/O port 352 at step 402. The named sequence and the optimization parameter are received at step 404 and the rest of the PDL commands are received at step 406.

Importantly, the control unit 350 processes the named sequence based upon the value of the optimization parameter at step 408. The control unit 350 processes the rest of the PDL commands (received at step 402 and at step 406) at step 410. The control unit 350 transmits video data (via the video buffer 364) to the print engine 358 at step 412. The print engine 358 responds to the video data by printing the document.

Now lets consider in more detail the operation of the control unit 350 to process the named sequence at step 408.

If the optimization parameter is set to value #1 (indicating that each instance of the form is to be printed from new video data), the control unit 350 operates to process the named sequence according to a first algorithm.

Figure 5:
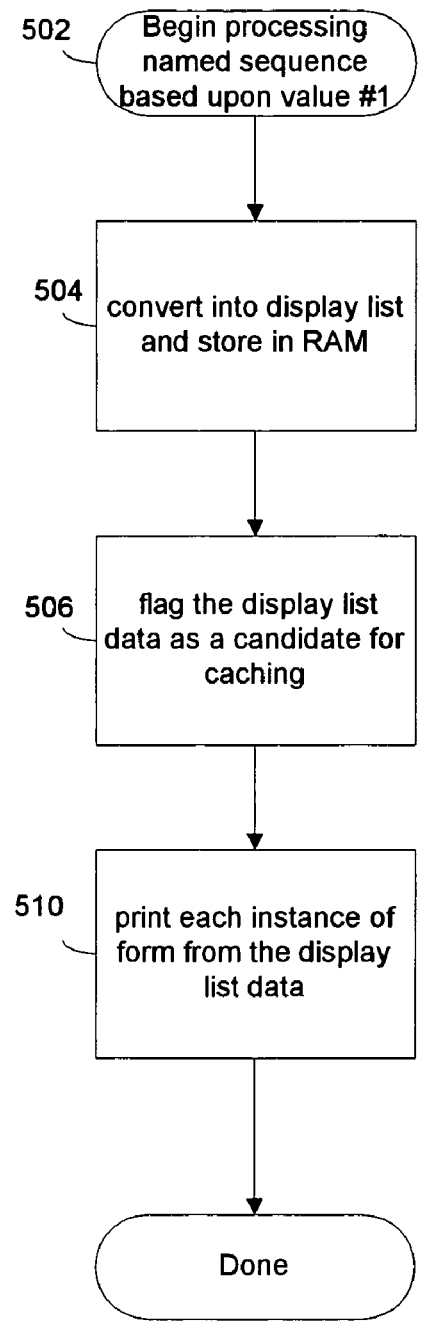
FIG. 5 is a flow chart illustrating the operation of the printer control unit according to the first algorithm.

FIG. 5 is a flow diagram illustrating the operation of the control unit 350 to process the named sequence according to this first algorithm. Referring now to FIG. 5, the control unit 350 begins processing the named sequence at step 502. The control unit 150 converts the named sequence into a display list (using the PDLI 368) and stores this data in the RAM 356 at step 504.

Next, the control unit 350 flags the display list (generated at step 504) as a candidate for caching (step 504). This indicates that this data will be accessed multiple time during the printing operation.

Next, the control unit 350 operates to print each instance of the form from the display list data (step 510). Thus, whenever video data is required to print an instance of the form, the display list data stored at step 504 is accessed from the RAM 356 and rendered by using the RIP 370. Importantly, this allows the RIP 370 to apply its optimization routines (e.g., halftoning), for enhancing print quality, each time the form is to be printed. Thus, as a result, each instance of the form is printed at an optimum print quality. It is noted for the later discussion, these routines may be dependant upon the spatial location of each instance of the form.

In the present embodiment, if the optimization parameter is set to value #2 or value #3, the control unit 350 operates to process the named sequence according to a second algorithm. As noted above, if the optimization parameter is set to value #2, this indicates that permission is granted to print each instance of the form from the same video data.

If the optimization parameter is set to value #3, this indicates that if new video data is generated to print each instance of the form, the new video data will, in each case, be identical. For purposes of this application a form that has this characteristic is referred to herein as a "fixed form".

Figure 6:
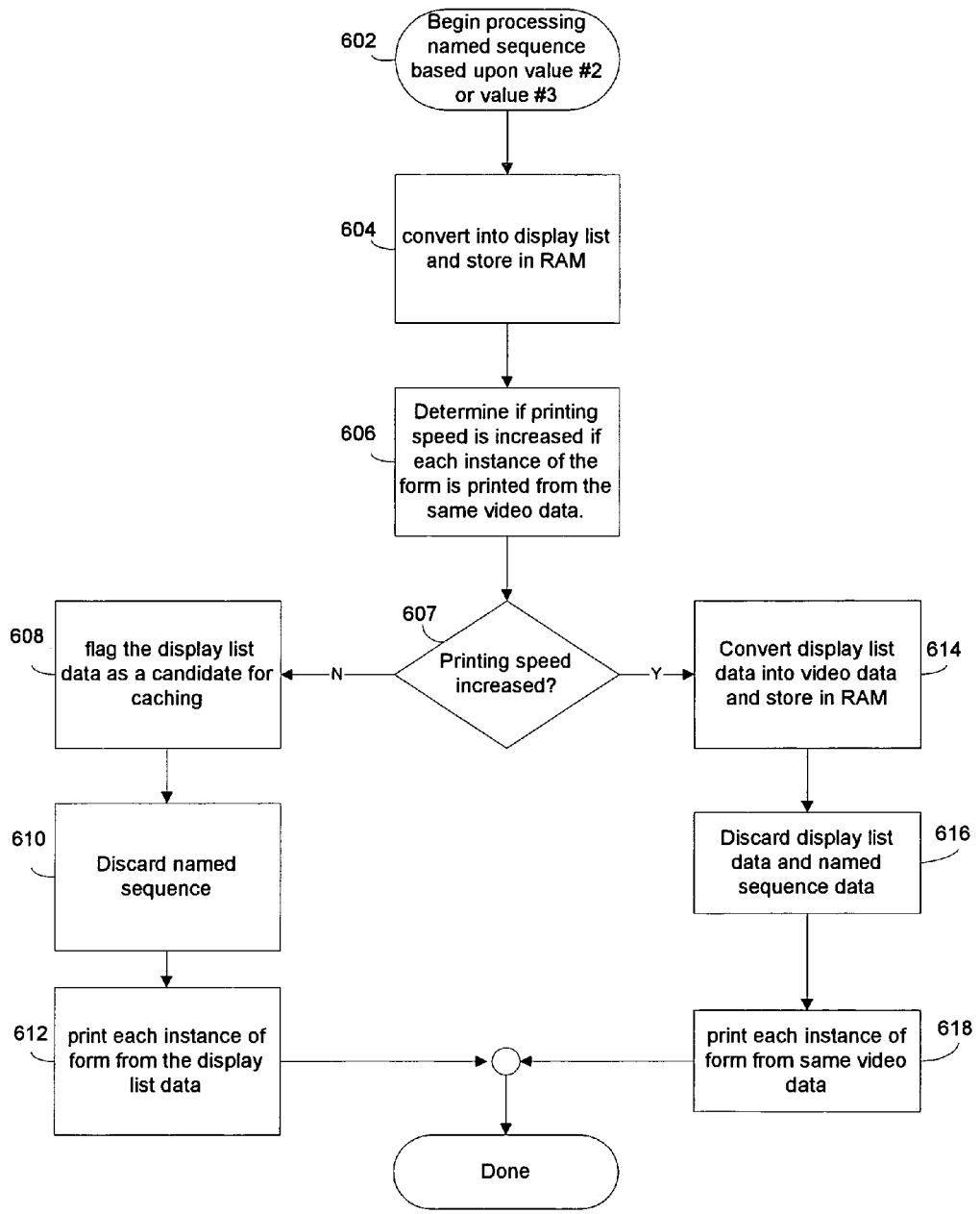
FIG. 6 is a flow chart illustrating the operation of the printer control unit according to the second algorithm.

FIG. 6 is a flow diagram illustrating the operation of the control unit 350 according to the second algorithm. Referring now to FIG. 6, the control unit 350 begins processing the named sequence at step 602. The control unit 350 converts the named sequence into a display list (using the PDLI 368) and stores this data in the RAM 356 at step 604.

Next, the control unit 350 analyzes the display list data to determine if the printing speed of the document would be increased if each instance of the form is printed from the same video data (step 606). This is as opposed to the printing speed that can be obtained if the form were printed from display list data, thereby incurring the delay associated with rendering the display list data for each instance of the form.

If it is determined that printing speed is not increased if each instance of the form is printed from the same video data, then the control unit 350 essentially applies the first algorithm to process the named sequence (decision step 607). Thus, the control unit 350 flags the display list data as a candidate for caching at step 608. Next, the control unit 350 operates to discard the named sequence at step 610 so as to release memory resources. The control unit 350 then operates to print each instance of the form from the display list data (step 612). Thus, whenever video data is required to print an instance of the form, the display list data stored at step 604 is accessed from the RAM 356 and rendered by using the RIP 370. Importantly, this allows the RIP 370 to apply its optimization routines (e.g. halftoning routines) each time the form is to be printed. Thus, as a result, each instance of the form is printed at an optimum print quality.

If, however, it is determined that the printing speed is increased if each instance of the form is printed from the same video data, then the control unit 350 operates to convert the display list data into video data (using the RIP 370) and to then store this data in the RAM 356 (step 614). Next, the control unit 350 operates to discard the display list data and the named sequence so as to release memory resources (step 616). Next, the control unit 350 operates to use the video data stored at step 614 to print each instance of the form (step 618). Thus, as a result, each instance of the form is printed from the same video data. Importantly, the RIP 370 is not able to apply its optimization routines each time an instance of the form is to be printed. As a result, under some conditions, printing quality may be less than optimum. Document printing speed, however, is optimized.

It is noted that print quality is less than optimum only if the parameter value is set to value #2. If the parameter value is set to value #3, print quality remains at an optimum level. This is illustrated in the two examples described below.

If the optimization parameter is set to value #4, the control unit 350 operates to process the named sequence according to a third algorithm. As noted above, this indicates that the named sequence represents a background image.

Figure 7:
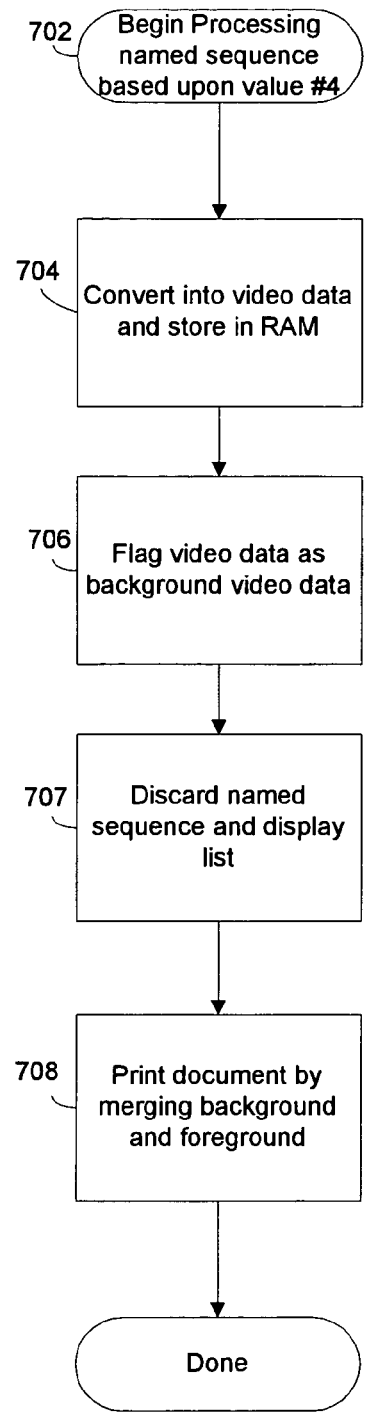
FIG. 7 is a flow diagram illustrating the operation of the printer control unit according to the third algorithm.

FIG. 7 is a flow diagram illustrating the operation of the control unit 350 to process the named sequence according to the third algorithm. Referring now to FIG. 7, the control unit 350 begins to process the named sequence at step 702. The control unit 350 operates to convert the named sequence into video data (by using the PDLI 368 and the RIP 370) and stores the video data into the RAM 356 at step 704. Next, the control unit 350 flags this video data as "background video data" at step 706. The control unit 350 then discards the named sequence received at step 702 and the display list generated at step 704 (step 707). This serves to release memory resources.

The control unit 350 then operates to print each page in the document that includes the background image by generating the foreground video for the page and then appropriately merging the background video data with the foreground video data (step 708). This is done so that the foreground image overlaps the background image. It is noted that one way this can be accomplished is by using the background video data to initialize the video buffer 364. The appropriate foreground video data is then written to video buffer 364 (thereby overwriting some or all of the background video data). Importantly, this is done so that the contents of the video buffer 364 represent the background image with the overlapping foreground image. The contents of the video buffer 364 are then transmitted to the print engine 358.

From the foregoing it will be appreciated that the printing system provided by the invention represents a significant advance in the art. The present invention provides a way for an application, executing in a computer, to control how a named sequence is processed by a printer. Moreover, the application can direct the printer to process a named sequence according to a printing algorithm that is most suitable for a given situation. For example, if the printing quality should be optimized over printing speed, the application can direct the printer to process the named sequence according to the first algorithm. If, however, printing speed is to be optimized over print quality, the application can direct the printer to process the named sequence according to the second printing algorithm.

To illustrate this and other advantages provided by this embodiment of the invention, consider the following examples.

EXAMPLE #1

Figure 8:
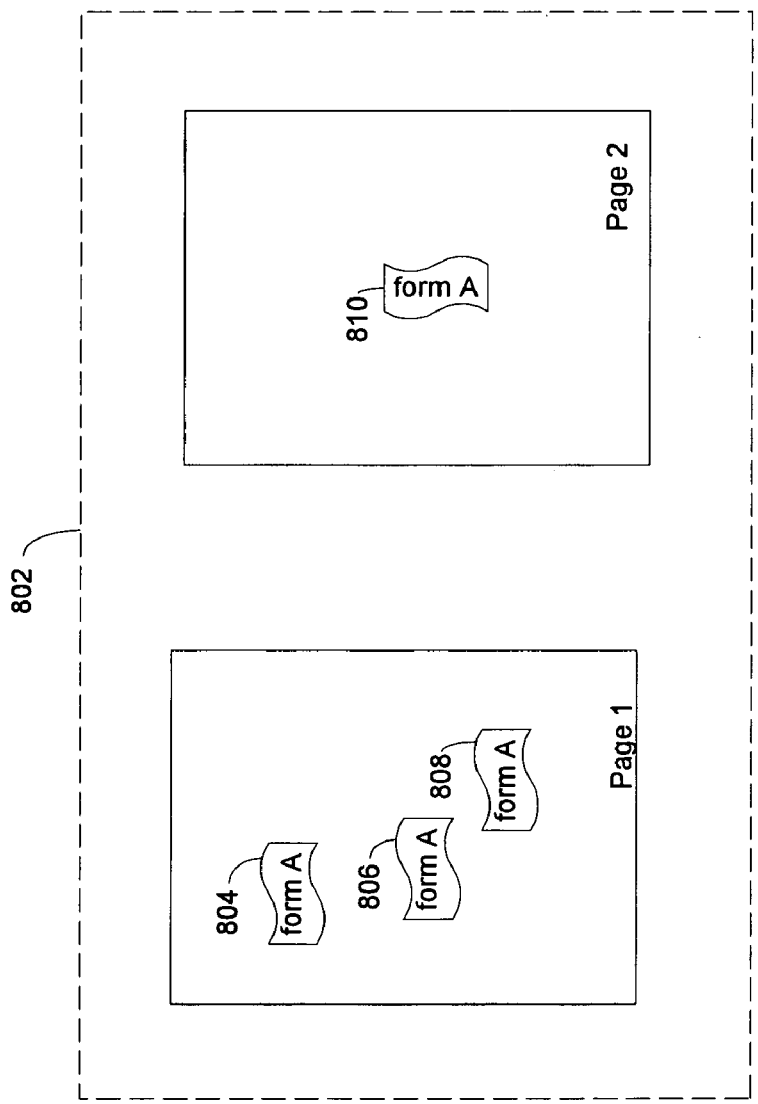
FIG. 8 illustrates a document that includes a form.

Assume that the application 312 is used to generate a document 802 which is depicted in FIG. 8. As indicated, the document 802 includes a form which is labeled as "form A".

Form A may represent any recurring image in the document such as a company logo. There are four instances of form A in the document 802: an instance 804, an instance 806, an instance 808 and an instance 810.

It is important to note that each instance of Form A is located spatially in a different location in the document 802. Thus, the following can be predicted:

(a) if a named sequence describing form A is processed by the control unit 350 according to the first algorithm, the print quality of form A is optimized. The printing speed of the document 802, however, may be less than optimum.

(b) if the same sequence describing form A is processed according to the second algorithm, the printing speed is optimized. The print quality, however, may be less than optimum.

Table 2 summarizes the comparative advantages and disadvantages of processing the named sequence describing form A under the first and the second printing algorithms.

TABLE 2

|  | First Printing Algorithm | Second Printing Algorithm |
| --- | --- | --- |
| Print Quality | Optimized | Less than optimum |
| Printing speed | less than optimum | Optimized |

Thus, it can be seen that if print quality is more important for a given situation or environment, the application 312 can be adapted to set the optimization parameter to "value #1". This directs the printer 104 to process the named sequence describing form A according to the first printing algorithm, resulting in higher print quality. If, however, printing speed is considered more important, the application 312 can be adapted to set the optimization parameter to "value #2". This directs the printer 104 to process the named sequence according to the second algorithm. As a result, printing speed is optimized.

In this manner the processing of the named sequence can be optimized for a given situation by setting the optimization parameter to the appropriate value.

EXAMPLE #2

Figure 9:
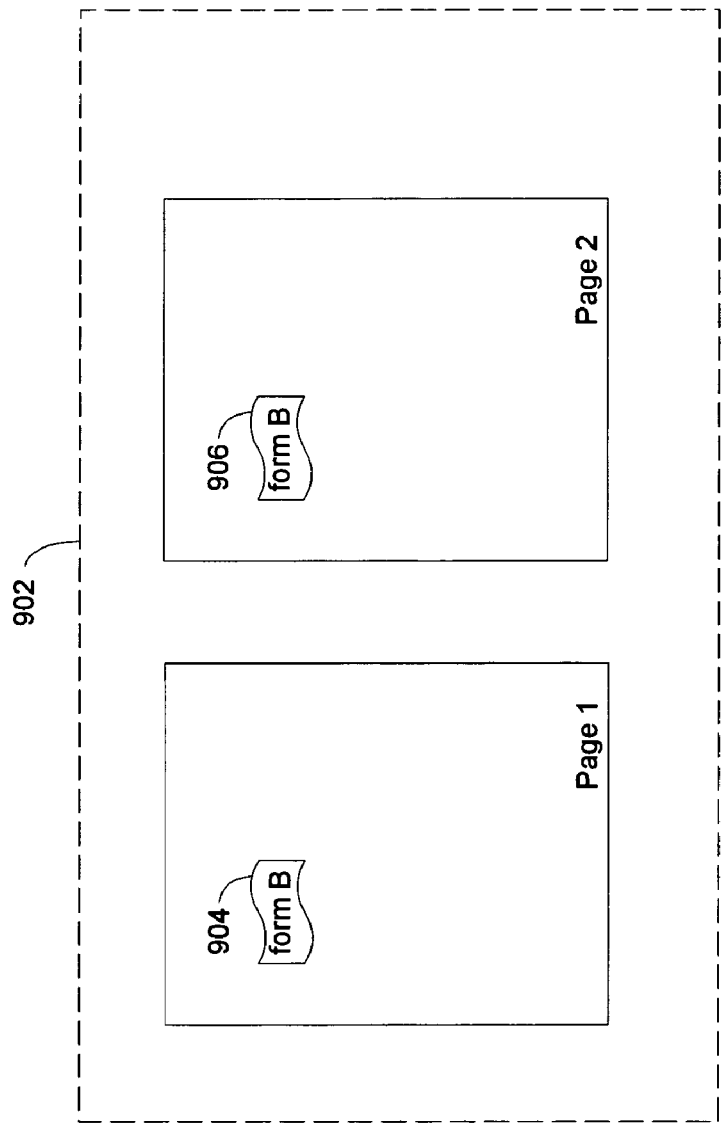
FIG. 9 illustrates a document that includes a "fixed form"

In this example, assume that the application 312 is used to generate a document 902 which is depicted in FIG. 9. As indicated, the document 902 includes a form which is labeled as "form B". Form B may represent any recurring image in the document such as a company logo. There are two instances of form B in the document 902: an instance 904 and an instance 906.

In this example, it is assumed that form B is a "fixed form". Thus, if a named sequence is converted to video data (first video data) to print the instance 904 and then converted again into video data (second video data) to print the instance 906, the first video data will be identical to the second video data.

Table 3 summarizes the comparative advantages and disadvantages of processing the named sequence describing form B under the first and the second printing algorithm.

TABLE 3

|  | First Printing Algorithm | Second Printing Algorithm |
| --- | --- | --- |
| Print Quality | Optimized | Optimized |
| Printing speed | less than optimum | Optimized |

Thus, in this case it can be seen that there is no advantage in terms of print quality to process the form under the first printing algorithm as opposed to the second printing algorithm. As a result, in this example, the application 312 can be adapted to set the optimization parameter for the named sequence to "value #3". This results in the named sequence being processed according the second algorithm. As a result, printing speed is optimized.

The reader should note that the printer 104 in this embodiment applies the same printing algorithm to a named sequence if the optimization parameter is set to value #2 or value #3. In other embodiments, however, a printer incorporating the invention may respond differently to these two values.

For example, it may be desirable for certain types of printers to always preserve the print quality of a form. In such a case, the printer can be adapted to apply the first printing algorithm to process a named sequence if the associated optimization parameter is set to value #2. If the optimization parameter is set to value #3, the printer applies the second printing algorithm as no degradation in form print quality would be expected. Printing speed is, however, increased.

It is noted that in the embodiment just described, the functionality provided by both the application and the print driver may be provided by just the application alone. Thus, an application may be adapted to generate a named sequence of PDL commands and an associated optimization parameter without the use of a print driver.

It is also noted that the functionality provided by any one of the programs described above (e.g., the application 312, the print driver 314 and the control firmware 367) may alternatively be provided in whole or in part by hardware components. For example, one or more of the steps illustrated in FIGS. 3-7 could be performed by operation of an application specific integrated circuit having appropriate logic gates, a programmable gate array (s) (PGA) or a field programmable gate array (FPGA). It is also noted that in alternative embodiments of the present invention, the steps indicated in FIGS. 3-7 may occur out of the order indicated in these figures. For example, two steps shown in succession may be executed substantially concurrently or in reverse order.

In addition, a print job may include more than one named sequence. In such a case, each sequence may include an associated parameter and be processed according to one of the algorithms described above.

It is further noted that the present invention may also be embodied in the form of a program storage medium with computer readable program code embodied therein. The computer readable program may represent the application 312, the print driver 314, or the control firmware 367. In the context of this document, "program storage medium" can be any means that can contain, store, communicate, propagate, or transport the program for use by or in connection with an instruction execution system, apparatus or device. The program storage medium can be, for example (the following is a non-exhaustive list), a magnetic, optical, or semiconductor based storage device.

Figure 10:
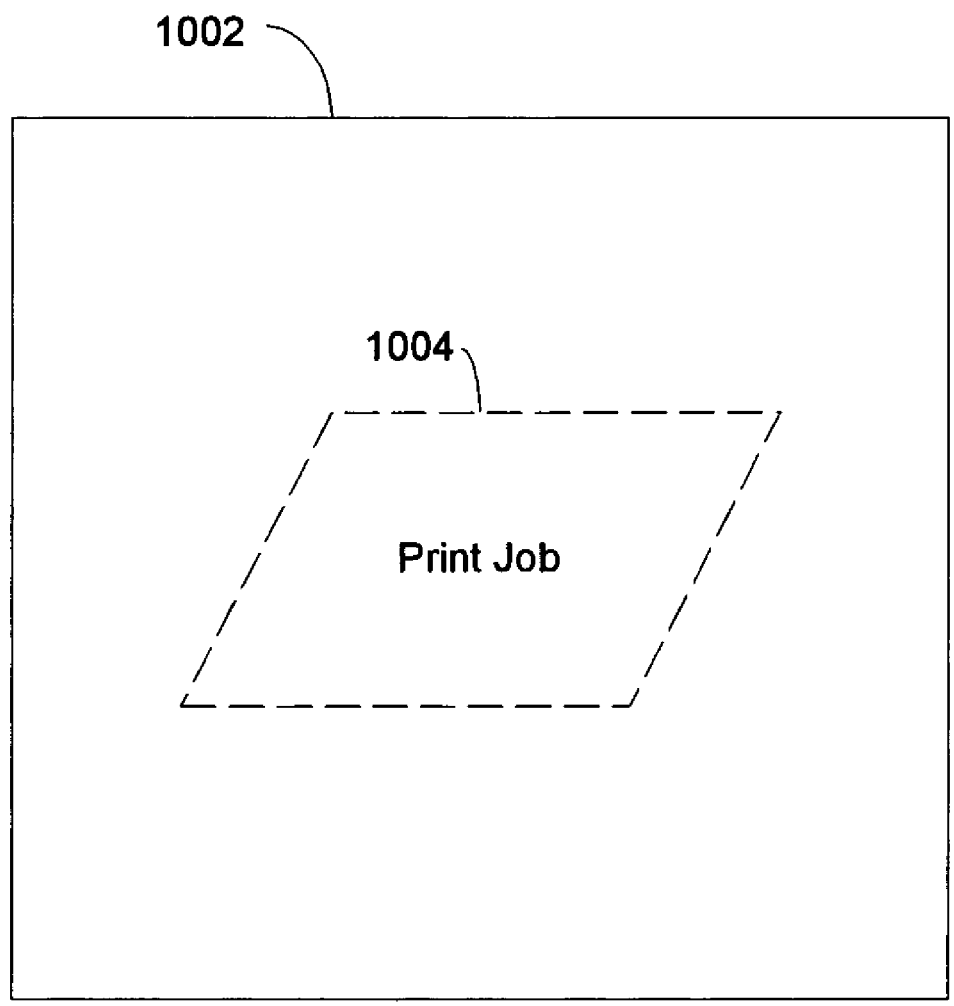
FIG. 10 illustrates yet another embodiment of the invention in the form of a program storage medium that includes a print job.

FIG. 10 illustrates yet another embodiment of the invention in the form of a program storage medium 1002 that includes a print job 1004. The print job 1004 includes PDL commands (i.e., computer readable code) that describes a document. The PDL commands includes a named sequence and also define an optimization parameter for the named sequence.

The print job 1004 may be expressed in any number of PDL languages. In this example, the language is POSTSCRIPT version 2 or higher. As is well known in the art, these versions of POSTSCRIPT use the form dictionary and resource operators in order to define a named sequence. In addition, the syntax of the POSTSCRIPT dictionary provides the means to define a additional key/value pair. Table 4 illustrates a portion of the print job 1004 to show how this POSTSCRIPT utility can be used to define an optimization parameter

TABLE 4

| | |
|---|---|
| /DictionaryName | |
| << | |
| /FormType 1 | % POSTCRIPT required key/value pair |
| /Matrix [Matrix value field] | % POSTCRIPT required key/value pair |
| /Bbox [Bbox value field] | % POSTCRIPT required key/value pair |
| /optimization_parameter (parameter value field) | % POSTCRIPT additional Key/value % for passing optimization parameter % to printer |
| /PaintProc {body of named sequence placed here} bind | % POSTCRIPT required key/value pair |

Thus, for example, the parameter value field can be set to the pre-defined values from TABLE 1 to direct a printer to process the named sequence according to an optimum algorithm for a given situation.

In the embodiments described above, a parameter value was used as an indicator to indicate the information described in Table 1. It is understood, however, that this same information may be communicated using other types of indicators, such as specific predefined PDL commands. For example, a first command may be defined to indicate that permission is granted to print each instance of an associated form from the same video data. Another command may be defined to indicate that if new video data is generated to print each instance of an associated form, the new video data will, in each case, be identical. A third command may be defined to indicate that an associated named sequence represents a background image. A fourth command may be defined to indicate that each instance of the form is to be printed from the same video data.

Although a specific embodiment of the invention has been described and illustrated, the invention is not to be limited to the specific forms or arrangements of parts so described and illustrated. The invention is limited only by the claims and equivalents thereof.

What is claimed is:

1. A printer, comprising:
an input/output port for receiving PDL print commands;
a control unit operatively connected to the input/output port;
a print engine operatively connected to the control unit; and
the control unit configured to respond to PDL print commands that include a named sequence describing a form and an indicator by (1) if the indicator indicates permission is granted to print each instance of the form from the same video data, processing the named sequence according to a first printing algorithm, (2) if the indicator indicates each instance of the form is to be printed from new video data, processing the named sequence according to a second printing algorithm, (3) if the indicator indicates the form is a fixed form, processing the named sequence according to the second algorithm, or (4) if the indicator indicates the form is a background image, processing the named sequence according to a third algorithm.

2. A computer readable medium having programming thereon configured to generate PDL print commands including a named sequence describing a form and an indicator indicating (1) permission is granted to print each instance of the form from the same video data, (2) each instance of the form is to be printed from new video data, (3) the form is a fixed form, or (4) the form is a background image.

3. The computer readable medium of claim 2, wherein the indicator comprises a parameter having a value associated with each of the four different indications.

4. Printer firmware comprising a computer readable medium having programming thereon for responding to PDL print commands that include a named sequence describing a form and an indicator by (1) if the indicator indicates permission is granted to print each instance of the form from the same video data, processing the named sequence according to a first printing algorithm, (2) if the indicator indicates each instance of the form is to be printed from new video data, processing the named sequence according to a second printing algorithm, (3) if the indicator indicates the form is a fixed form, processing the named sequence according to the second algorithm, or (4) if the indicator indicates the form is a background image, processing the named sequence according to a third algorithm.

* * * * *